3,387,070
METHOD FOR PRODUCING SHAPED ARTICLES OF WATER-INSOLUBLE POLY-DL-ALANINE
Ryoichi Wakasa, Shinichi Ishida, and Chihiro Oizumi, Tokyo, Japan, assignors to Asahi Kasei Kogyo Kabushiki Kaisha, Osaka, Japan, a corporation of Japan
Filed Apr. 13, 1964, Ser. No. 359,364
Claims priority, application Japan, Apr. 15, 1963, 38/18,084, 38/18,085
6 Claims. (Cl. 264—178)

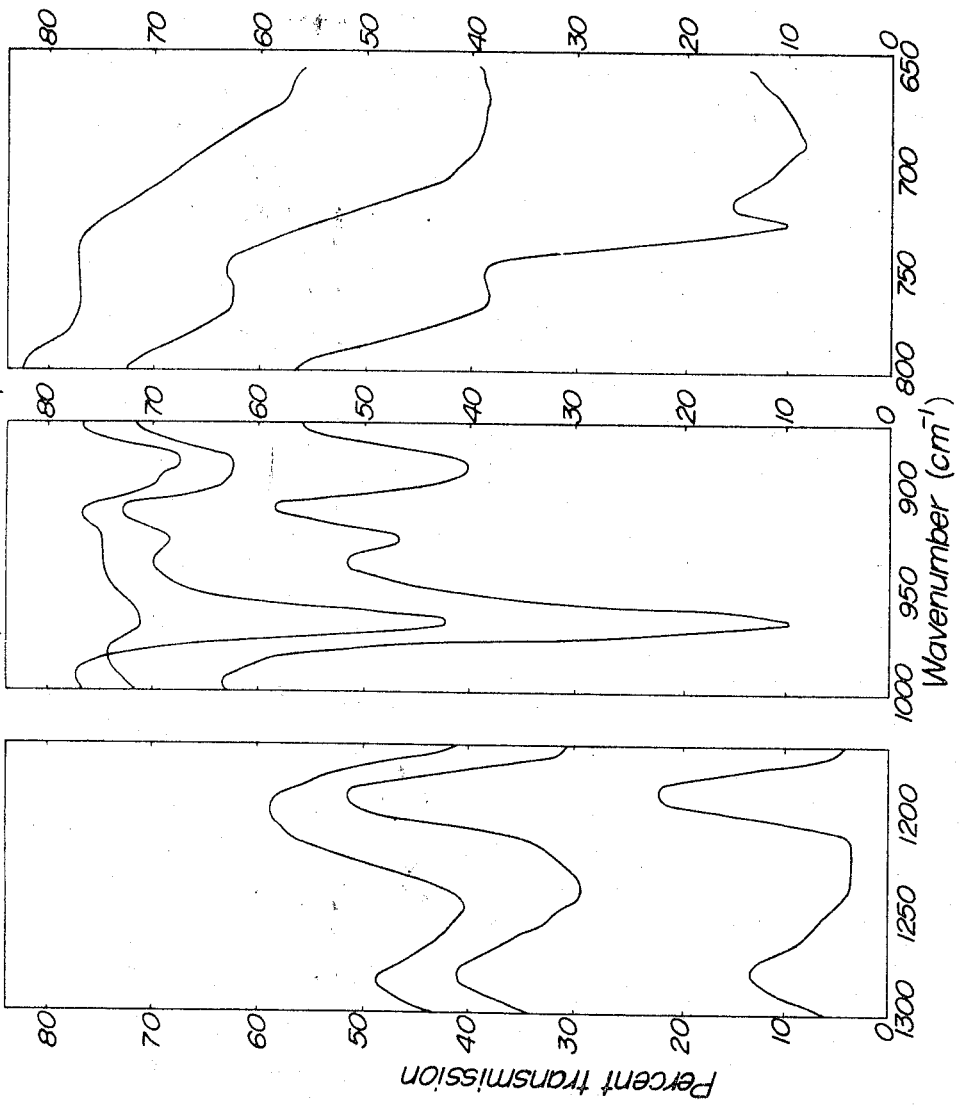

ABSTRACT OF THE DISCLOSURE

A process for producing shaped articles, especially fibers, of water-insoluble poly-DL-alanine from water-soluble poly-DL-alanine by way of wet spinning in which:
 (i) Phenols containing an acid having a pKa below 5.0 are used as a solvent to produce a solution of poly-DL-alanine;
 (ii) Aromatic hydrocarbons (more than 50% by volume of the total amount) are used as a coagulating bath with or without an acid having a pKa below 5.0 and other organic solvents;
 (iii) The shaped article obtained by extruding the polymer solution into the coagulating bath is stretched from 2–10 times its original length in the coagulation bath;
 (iv) The shaped article obtained in (iii) above may be further subjected to a thermal treatment including thermal stretching at a temperature of 40° to 250° in an aromatic hydrocarbon, a halogenated hydrocarbon, carbon disulfide or the like or a mixture of two or more thereof.

---

This invention relates to a method for producing shaped articles, especially fibers, of water-insoluble poly-DL-alanine.

Since research on the synthesis of polypeptides having a higher molecular weight from N-carboxy-α-amino acid anhydrides (hereinafter referred to as NCA) prepared by H. Leuchs (Ber. 39, 857 (1906)), as the starting material, was successfully accomplished by Woodward and Schramm (J. Am. Chem. Soc., 69, 1551 (1947)), the method has become the most common one for preparing a high molecular weight polypeptide.

From the standpoint of a structural study of proteins, various kinds of α-amino acid polymers have been synthesized according to the NCA method, but the most of the studies have been directed toward α-amino acids having a steric arrangement similar to that of natural amino acids in relation to the protein, and only a few studies on polypeptides made of DL-amino acids which do not exist in nature has been made. Since then, the polymers of α-amino acids have been studied from the standpoint of synthetic fibers, and a variety of interesting results have been obtained on the synthesis of poly-DL-alanine of which DL-alanine is a constituent unit. The most common method uses α-alanine-NCA as the starting material, but like glycine, this amino acid is difficult to convert into a higher molecular weight polymer. All of the poly-DL-α-alanine heretofore obtained have been polymers of relatively lower molecular weight. For example, the poly-DL-alanines, as seen in T. Astbury (Nature, 162, 1596, (1948)), A. C. Farthing, Coleman (J. Chem. Soc., 1950, 3222), A Elliot (Nature, 170, 1066 (1952)), A. Elliot (Proc. Roy. Soc., A 221, 104 (1954)), Sela, Berger (J. Am. Chem. Soc. 77, 1893 (1955)), Noguchi (J. Chem. Soc. Japan, 75, 639 (1954)), Ishizuka (Japanese patent Pub. No. 18,695/1961) and the like, have a value of reduced viscosity ($\eta_{sp/c}$) of less than 0.3 to 0.4, and the most are water-soluble in powder or film state. The poly-DL-alanine having the highest molecular weight among those which have been heretofore reported was synthesized by researchers at E. I. du Pont (U.S. Patent 2,729,621). As a result of much research wherein they used a variety of halogenated hydrocarbons and aromatic hydrocarbons as the polymerization solvent, they found that benzene would serve as the polymerization solvent which yielded the highest molecular weight, and further they carried out the synthesis of poly-DL-alanine having a molecular weight corresponding to a viscosity of $\eta_{inh}=0.73$. They prepared films from those polymers, and carried out the hot water extraction test. Then, they recognized that part thereof exhibits water solubility. However, there has not been found any description of water resisting properties of those polymers which have been formed into fiber form, but as the results of our follow-up research, those polymers are found to be all soluble in water and also very poor in application thereof to general use, especially textile fiber.

As the result of our thorough study of the synthesis of poly-DL-alanine and the formation of fibers therefrom, we successfully obtained water-insoluble and hot water-resistant shaped articles excellent in strength, especially fiber, yarn, film, sheet, mould and the like according to method which will be described below, and further it was found that these can be made into cloth textile having excellent dyeability, touch and suitable hygroscopicity. Furthermore, we have found a method for the manufacture of poly-DL-alanine having very much higher molecular weight which is very suitable for the manufacture thereof. This kind of poly-DL-alanine has never before been obtained.

By combinations thereof, shaped articles such as fiber, film and the like can be successfully obtained from the poly-DL-alanine. These articles have been impossible to obtain before.

Generally, the poly-DL-alanine obtained according to the conventional method as stated above is very soluble in water, formic acid, dichloroacetic acid, trifluoroacetic acid, sulfuric acid, m-cresol and the like.

Accordingly, the shaping and processing of poly-DL-alanines has been heretofore carried out according to the conventional method wherein it is dissolved in m-cresol or formic acid, and thereafter the solvent is evaporated, or coagulation is effected in alcohols or acetone to form film or fiber and the like (for example U.S. Patent 2,729,621). If the film is prepared according to the conventional method, part of the film exhibits water solubility, and films having perfect insolubility in water can hardly be obtained (U.S. Patent 2,729,621). If fibers are formed therefrom, the fibers thus obtained tend to be readily soluble even in cold water. Therefore, the fibers of poly-DL-alanine have never been expected to be practicable.

As a result of our research on a processing method chiefly for the fibers, we, contrary to the expectation induced from the conventional well-known knowledge, have succeeded in forming fibers based on a new poly-DL-alanine fiber which also exhibits no solubility in hot water and of course cold water. These water-insoluble fibers or films have quite different properties from those of the films or fibers prepared according to the conventional well-known method where infrared absorption bands appear at 695 cm.$^{-1}$ and 1219 cm.$^{-1}$, corresponding to the absorption bands at 695 cm.$^{-1}$ and 1221 cm.$^{-1}$ respectively on the anti-parallel β-structure of poly-L-alanine, and further, a new absorption band appears at 730 cm.$^{-1}$, and the absorption band at 965 cm.$^{-1}$ becomes quite intense. In view of these facts, almost all the shaped articles obtained according to the conventional well-known method have a random coiling structure, but the new shaped articles of water-insoluble poly-DL-alanine instantly obtained seem to have a β-configuration. According to X-ray photographs of the fiber, the existence of oriented crystals has been found. In consideration of the results of the said infrared measurement, it seems to have an oriented β-form.

The shaped article made of the new water-soluble poly-DL-alanine cannot be obtained simply by stretching the film or fiber obtained according to the conventional well-known method (cf. U.S. Patent 2,729,621).

The forming method according to the present invention is based on a so-called wet process, consisting of polymer solution, coagulation bath and stretching bath. The latter two may be performed in the same bath.

The solvent for the solution in the present invention consists chiefly of phenols of 6 to 12 carbon atoms and which is added with acids having a pKa value below 5 in amounts between 0.5% and 60% by volume to the total amount. In this case, the phenols to be used are liquid at temperatures below 100° C., including a single phenol or a mixture of two or more of phenol, o-cresol, m-cresol, p-cresol, p-chlorophenol, xylenol, o-chlorophenol, m-nitrophenol, p-nitrophenol, thymol, propylphenol, butylphenol, guaiacol and eugenol.

Further, the acid herein used having a pKa value below 5 is a mono- or dicarboxylic acid of 1 to 3 carbon atoms such as formic acid, oxalic acid, acetic acid and the like, or a haloacid acid of 2 to 3 carbon atoms such as dichloroacetic acid, trichloroacetic acid, trifluoroacetic acid, dichloropropionic acid, trichloropropionic acid and the like, or a cyano carboxylic acid such as α-cyano acetic acid, α-cyano propionic acid and the like, or an inorganic acid such as perchloric acid, hydrochloric acid, sulfuric acid, nitric acid and the like, and mixtures of two or more of the abovementioned acids can be used. The amount of these strong acids depends upon the kind of acid to be used, but an amount between 0.5% and 60% by volume of the total amount of solvent is preferably used.

m-Cresol has been heretofore used as the solvent for poly-DL-alanine, but phenol compounds other than m-cresol as mentioned above are all used for the first time as the solvent for poly-DL-alanine, and the system including the said strong acids together therewith is novel. In this way, if the system includes the strong acid, the solubility of poly-DL-alanine generally will be increased rather than that of a single system of phenolic compound, and a solution of higher concentration can be obtained. For example, the solubility of poly-DL-alanine in a mixed system of m-cresol, p-cresol, phenol with formic acid is as follows:

TABLE 1.—SOLUBILITY OF POLY-DL-ALANINE IN PHENOL COMPOUNDS CONTAINING FORMIC ACID (G./100 CC.)

| Formic acid content | Percent | | | | |
|---|---|---|---|---|---|
| | 0 | 10 | 20 | 40 | 60 |
| m-Cresol | 20.0 | 26.5 | 33.5 | 40.0 | 43.5 |
| p-Cresol | 28.5 | 40.0 | 50.0 | 50.0 | |
| Phenol | 39.5 | 44.0 | 59.0 | 59.0 | |

The advantages of the inclusion of the strong acid is not only to increase the solubility, but also to be in an important correlation with efficient preparation of shaped article from water-insoluble poly-DL-alanine.

The coagulation bath used according to the present invention may be any of the following:

(1) Aromatic hydrocarbons.

(2) Mixture of aromatic hydrocarbons and the acids having a pKa value below 5.0 used in the polymer solution.

(3) Mixture of aromatic hydrocarbons and other solvents.

(4) Mixture of aromatic hydrocarbons and other solvents and the acids having a pKa value below 5.0 used in the polymer solution.

The aromatic hydrocarbons include hydrocarbons, halogenated hydrocarbons and aromatic nitriles of 6 to 12 carbon atoms including one or a mixture of two or more of benzene, toluene, m-xylene, o-xylene, p-xylene, trimethyl benzene, durene, ethyl benzene, cumene, cymene, isopropyl benzene, diethyl benzene, diisopropyl benzene, naphthalene, α- or β-methyl naphthalene, dimethylnaphthalenes, diphenyl and anthracene.

As other solvents the following organic solvents are included:

(a) Alcohols or glycols having 1 to 12 carbon atoms such as methanol, ethanol, n-propanol, isopropanol, butanol, isobutanol, pentanol, cyclopentanol, hexanol, cyclohexanol, heptanol, octanol, nonanol, decanol, etc., and benzyl alcohol, ethylene glycol, diethylene glycol, propylene glycol, trimethylene glycol, tetramethylene glycol, glycerin.

(b) Ketones, one or a mixture of two or more of aliphatic, aromatic or mixed ketones. Ketone having 3 to 15 carbon atoms, such as acetone, methyl ethyl ketone, diethyl ketone, methyl propyl ketone, diisopropyl ketone, methyl isobutyl ketone, diisobutyl ketone, acetophenone, benzophenone, methyl benzyl ketone, cyclohexyl benzyl ketone, cyclohexanone, cyclopentanone.

(c) Nitriles having 2 to 12 carbon atoms, either singly or a mixture of two or more of acetonitrile, propionitrile, butyronitrile, acrylonitrile, adiponitrile, benzonitrile.

(d) Ethers having 2 to 12 carbon atoms such as dimethyl ether, diethyl ether, dipropyl ether, dibutyl ether, dipentyl ether, diethylene glycl dimethyl ether, ethylene glycol dimethyl ether, ethylene glycol diethyl ether, dibenzyl ether, anisol, dioxane, tetrahydrofurane, pyrane.

(e) Halogenated hydrocarbons having 1 to 12 carbon atoms such as choroform, methylene dichloride, methyl chloride, methylene dibromide, methyl bromide, tetrachloromethane, ethyl chloride, ethyl bromide, ethyl iodide, ethylene dichloride, ethylidene chloride, 1,1,1-trichloroethane, trichloroethylene, 1,1,2-trichloroethane, 1,1,2,2-tetrachloroethane, 1,1,1,2 - tetrachloroethane, tetrachloroethylene, pentachloroethane, propyl chloride, dichloropropane, trichloropropane, butyl chloride, dichlorobutane, trichlorobutane, trichloropentane, monochlorobenzene, dichlorobenzene, trichlorobenzene, chlorotoluene.

(f) Esters; aliphatic carboxylic acid esters of 1 to 5 carbon atoms with alkyl radical of 1 to 10 carbon atoms such as methyl formate, ethyl formate, methyl acetate, ethyl acetate, propyl acetate, butyl acetate, arryl acetate and the like, and aromatic carboxylic acid of 1 to 10 carbon atoms such as methyl benzoate, ethyl benzoate.

(g) Phenols having 6 to 12 carbon atoms, such as phenol, o-cresol, m-cresol, p-cresol, p-chlorophenol, o-chlorophenol, xylenol, m - nitrophenol, p - nitrophenol, thymol, propylphenol, butylphenol, guaiacol, eugenol.

These solvents are used in amounts less than 50% by volume of the total solvent to be used and this amount varies depending upon the kind of the solvent to be used.

Further, it is more effective and better to add in advance to the coagulation bath the same acid as the organic or inorganic strong acid used for the polymer solution, and these concentrations are controlled so that the spinning conditions are constant. The amount of the strong acid to be added in advance is preferably less than 30% by volume of the total solvent.

The components of the polymer solution may naturally be mixed into the coagulation bath in the course of processing, but their mixing does not influence the essentials of the processing.

When a mixture of an aromatic hydrocarbon with the above-described (a) to (g) is used as the coagulation bath, it is preferable that the coagulation bath contains more than 50% by volume of the aromatic hydrocarbon.

As the conventional coagulation solution there has been used lower alcohols such as methanol, ethanol and the like, lower ketones such as acetone and the like have been used. Especially, acetone has been preferably used in combination with m-cresol. However, when acetone is used as the coagulation solution, the film thus obtained has not a complete insolubility in water, and from the result of infra-red absorption measurement, it has been found to have a random coiling structure. The property cannot be changed into insolubility in water only by stretching and other means. When such is the case, lower alcohols such as methanol, ethanol and the like have been used. The strength of the shaped article in that case tends to be more detriorated than in the case of acetone. However, in our case when a mixture solution consisting chiefly of aromatic hydrocarbons is used, it has been found from the measurements of infra-red absorption thereof that the shaped article, as described in the foregoing, has β-form as the main structure and is characterized by a complete insolubility in water, effected by carrying out a simple aftertreatment. A single aromatic hydrocarbon, for example, toluene acts as the coagulation solution having substantially the same function, but it is preferable to use a mixture solution added with the other solvent, for example, a suitable amount of acetone and the like to improve the coagulating effect, and it is more preferable to add thereto the same strong acid as was added to the polymer solution. The ratio of mixing depends upon the kind of aromatic hydrocarbons, the kind of other solvents to be added to improve the coagulating effect and the like, but it is preferable that the aromatic hydrocarbon content be more than 50% by volume of the total solvent. A mixture of 750 cc. of toluene, 250 cc. of acetone and 4 cc. of formic acid is one example. The film or fiber thus shaped in such a coagulating bath is taken out or stretched by 100 to 1000% at a temperature of between −10° C. and 100° C. The shaped articles thus obtained are preferably subjected to the following treatment to further improve their properties.

The shaped article obtained in the above way is immersed for a long period of time in toluene, or subjected to treatments including stretching in hot toluene to improve the shaped article into a complete insolubility in water. As a solution effective in the insolubilization treatment, the same solution as the coagulating solution, or the solution modified somewhat in the composition thereof can be used. Any of those which have less solubility to the aforementioned strong acid used as the additive, such as carbon disulfide, and the like may be used other than the above. Those will control the solution rate of the aforementioned strong acids remaining in the shaped article, and therefore it is necessary that the said strong acid should remain in the shaped article which is to be subjected to the treatment. Accordingly, even when the solution including the said strong acid is used, and acetone is used in the coagulation bath, and when the strong acid remains in the shaped article by reducing the time of immersion thereof in the coagulation bath as short as possible, the water-insoluble product can be obtained by treating it with the said insolubilization treatment solution. The fiber (4 to 10 den.) thus obtained cannot be dissolved even by immersing it in boiling water for several hours.

If the foregoing description is to be summarized, the present invention is carried out in the following way.

(1) Phenols containing acids having a pKa value below 5.0 are used as the solvent and serves as the polymer solution for poly-DL-alanine.

(2) A mixture consisting of aromatic hydrocarbons (more than 50% by volume of the total amount) with or without acids having a pKa value below 5.0 and other organic solvents is used for the coagulation bath.

(3) The shaped article obtained by extruding the polymer solution into the coagulation bath is stretched from 100% to 1,000% in the coagulation bath or a mixture of the same components or similar, modified mixture solution.

(4) The shaped article obtained in (3) may be further subjected to a thermal treatment including thermal stretching at a temperature of 40° to 250° C. in a single solvent or a mixture of two or more of aromatic hydrocarbons halogenated hydrocarbons, carbon disulfide and the like.

The above method is one wherein processing can be successfully effected independent of the molecular weight of poly-DL-alanine, and, for example, a film insoluble in hot water can be prepared from poly-DL-alanine of reduced viscosity of 0.62. However, in order that fiber and film may possess the desired remarkable strength, it is preferable similarly as in the case of other polymers, to form shaping from poly-DL-alanine having a higher molecular weight, especially it is preferable to employ such poly-DL-alanine having a reduced viscosity of more than one so as to form a fiber. However, as poly-DL-alanine with higher molecular weight has been heretofore hard to obtain, it has been not recognized as a satisfactory raw material. The said method can be sufficiently applied to poly-DL-alanine having a reduced viscosity of less than one according to the conventional method, and fiber, film and others having good water resistance and practicability can be obtained, but we have further provided a method for the manufacture of poly-DL-alanine with higher molecular weight which has not yet been known and is capable of accomplishing a remarkable effect by using it in combination with the said method.

Generally, the polymerization reaction is mostly influenced by the reaction solvent. The polymerization of α-amino acid NCA is one example of this kind, and especially α-amino acid NCA of the DL-type has a remarkable tendency of this kind. Taking into consideration these facts, and as the results of various studies of polymerization reaction solvent or DL-alanine NCA, we used 1,1,2,2-tetrachloroethane as the polymerization reaction solvent and, by keeping the concentration of NCA below 20 g./100 cc. and a reaction temperature at a suitable one of less than 100° C., we found that poly-DL-alanine of a higher degree of polymerization with a reduced viscosity of 1.5 or more (1% in dichloroacetic acid at 25° C.) can be obtained in the polymerization reaction where a conventional well-know tertiary amine is used as the catalyst. It is possible to carry out the polymerization reaction of DL-alanine NCA in various solvents. Mostly, oxygen-containing compounds are used such as dioxane, tetrahydrofuran, ethyl acetate, diethyl ether, acetone and the like. These solvents yield a polymer of a lower degree of polymerization, and aromatic hydrocarbon, nitro derivatives, halogen derivatives or the like thereof can generally yield the polymer of rather high degree of polymerization. Most other halogenated hydrocarbons can yield the polymer of rather high degree of polymerization. For example, when purified chloroform is used as the polymerization reaction catalyst, it is not difficult to obtain a polymer of higher degree of polymerization with a reduced viscosity of about one. However, there are such solvents like carbon tetrachloride that hardly dissolve DL-alanine NCA, also, it is necessary to provide a means which controls the decomposition of 1,1,2,2,-tetrachloroethane itself.

Purification of 1,1,2,2-tetrachloroethane as the solvent for polymerization reaction of NCA of this kind can be readily carried out in the following way. That is, the impurities tending to form detrimental substances through decomposition, chiefly trichloroethylene, can be removed by shaking raw tetrachloroethane togther with concentrated sulfuric acid at room temperature. It can be inferred from the fact that the absorption bands of 835 cm.$^{-1}$, 905 cm.$^{-1}$ and 927 cm.$^{-1}$ have been diminished from the infra-red absorption spectrum by sulfuric acid treatment. Thereafter, tetrachloroethane sufficiently washed with sulfuric acid is thoroughly washed with dilute alkali solution, and dried. Then, a small amount of toluene is added thereto, followed by fractionation. The fraction distilling at 144° to 147° C. is collected, and 0.1 to 1% toluene is added thereto. Then, a molecular sieve 4A or 5A is added. Thereafter, it is kept stored with no exposure to sun light. The toluene thus added serves as a decomposition prohibitor of 1,1,2,2-tetrachloroethane, and the molecular sieve serves to remove traces of moisture and hydrogen chloride. If the polymerization reaction of DL-alanine NCA is carried out using 1,1,2,2-tetrachloroethane thus purified as the solvent for the polymerization reaction, a poly-DL-alanine of higher degree of polymerization with a value of reduced viscosity at 2 or more can be readily synthesized. The raw crystals obtained by reaction of DL-alanine with phosgene in dioxane or tetrahydrofuran according to the conventional well-known method is recrystallized in ether or other organic solvent, and the pure NCA is thus obtained and used as DL-alanine NCA for the polymerization reaction. Poly-DL-alanine thus obtained is a white lumpy material, and it is very hard to pulverize it as such and get it in a powdery state. The infrared absorption spectrum is the same, for example, as that of poly-DL-alanine obtained by polymerization in benzene, and the conformation in the main chain principally exhibits a random coiling structure. The solubility thereof in organic solvents is the same as the conventional poly-DL-alanine, and it can dissolve in formic acid, dichloracetic acid, trifluoroacetic acid, sulfuric acid and m-cresol. The molded article such as film, fiber and the like having excellent properties which have been heretofore never known can be obtained by using the poly-DL-alanine of higher moleculer weight obtained by this method in the said spinning and molding methods, and it is believed that a new market will be developed therefor.

The principal characteristics of these films, fibers and the like will be briefly described as follows:

(i) Resistance to water or hot water.

(ii) Resistance to chemicals. It cannot be deteriorated by petroleum organic compounds, most polar solvents, diluted acid aqueous solutions, and diluted alkali aqueous solutions.

(iii) Dyeability. It can be dyed clearly, firmly and in dark color with acid dyes, basic dyes, disperse dyes, vat dyes, sulfide dyes and the like.

(iv) High strength, elasticity and flexibility.

(v) Good luster.

(vi) Silky touch.

The present invention will be further illustrated in the following examples, but is not restricted to these examples. Many modifications can be effected according to the principal of the present invention without departing from the scope thereof.

Preparation of solvent for polymerization.—To 10 l. of 1,1,2,2-tetrachloroethane are added 600 cc. of concentrated sulfuric acid and mixed at room temperature. The sulfuric acid becomes reddish brown gradually, and is replaced every eight hours, and washing is carried out three times in total with sulfuric acid. At the last stage, the sulfuric acid exhibits almost no color. After separation of the sulfuric acid, washing is carried out five times with 5% caustic potash or soda solution and further sufficiently with water. At the final stage, the layer of tetrachloroethane becomes almost transparent with no white turbidity. After drying by use of anhydrous potassium carbonate, 300 cc. of toluene are added thereto and fractionation is carried out under atmospheric pressure.

The fraction distilling at 144° to 145° C. is collected (about 8 l.), and 40 cc. of toluene is added thereto, and a small amount of molecular sieve 4A is added. Then, it is kept stored in a brown bottle.

In the meantime, in case that it is to be used as the polymerization solvent, it should be shaken with a silver nitrate solution and preferably kept stored until the white turbidity of silver chloride does not appear.

Preparation of NCA of DL-alanine.—To 1 l. of dried tetrahydrofuran are added 50 g. of DL-alanine, through which is passed phosgene at a temperature of 48° C., while preventing moisture from air and agitating the mixture.

The alanine dissolves in about one hour, and a colorless reaction solution is obtained. After the supply of phosgene is stopped, dry air is passed through to remove the unreacted phosgene. After filtration, tetrahydrofuran is distilled off over a water bath at 40° C. under reduced pressure. By cooling and scraping, 70 g. (108.5%) of light-brown syrup begins to crystallize out at once. The raw crystals are dissolved in 70 cc. of ether containing 10% (v./v.) dichloroethane at an elevated temperature and, after being subjected to treatment with activated carbon, crystallize out and are filtered off after cooling to a temperature of 0° C. In this manner, recrystallization is carried out three or four times, and 41.7 g. (theoretically 64.5%) of the pure NCA is obtained. M.P. 50.0°C.; Beilstein reaction: negative.

Preparation of poly-DL-alanine (A).—A 2 l. flask is flushed with dry nitrogen, and 1.5 l. of purified tetrachloroethane and 45 g. of purified DL-alanine NCA are placed therein at room temperature. To the above NCA solution are added 2.7 cc. of a solution wherein 13.4 g. of tri-n-butyl amine is diluted to 100 cc. with dioxane, and, after thorough shaking, a reflux condenser with a calcium chloride drying tube is provided. Polymerization is carried out over a water bath at a temperature of 60° C. by allowing the mixture to settle for 48 hours. The polymer floats on the solvent surface initially, but a rigid colorless gel is formed when the polymerization reaction reaches completion.

After as much as possible of the solvent is removed by aspiration on a filter (No. 2), tetrachloroethylene is extracted and removed from the polymer by heating it together with methanol several times. After drying under reduced pressure in a desiccator provided with calcium chloride, it is kept drying at a temperature of 60° to 70° C. at a pressure of 1 mm. Hg. until there is no further decrease in weight. Yield: 23.5 g. (theoretically 84.5%).

The poly-DL-alanine thus obtained is in a white lumpy state and is hard to pulverize. It dissolves in formic acid, dichloroacetic acid, trifluoroacetic acid, m-cresol, cresol sulfuric acid, phosphoric acid, and molten phenol, p-cresol, o-cresol, p-chlorophenol, and acetamide. The reduced viscosity of a 1% solution in dichloroacetic acid (25°) was 2.20 ($=\eta_{sp.}/c$).

Preparation of poly-DL-alanine (B).—A content of 2 l. flask is flushed with dry nitrogen, and 1.5 l. of purified chloroform and 45 g. of purified DL-alanine NCA are placed therein at room temperature, to the resulting solution are added 2.7 cc. of the tri-n-butylamine solution described immediately above in the preparation of poly-DL-alanine (A). Polymerization is carried out under the same condition as in Preparation (A). The polymer which crystallizes out becomes a rather white gel.

After filtration through a glass filter, the procedure of (A) is followed, after which the product is washed with methanol and dried. Yield: 24.4 g. (theoretically 88.0%). The reduced viscosity of this poly-DL-alanine in 1% dichloroacetic acid at a temperature of 25° C. was 1.03 ($=\eta_{sp.}/c$).

Preparation of poly-DL-alanine (C).—A 2 l. flask is flushed with dry nitrogen, and 1.5 l. of purified dichloroethane and 45 g. of purified DL-alanine NCA placed therein. Polymerization is carried out under the same condition as that in Preparation (A). Thereby is obtained 10.4 g. (theoretically 66.2%) of a white, fragile, lumpy polymer, and the reduced viscosity thereof in 1% dichloroacetic acid solution at a temperature of 25° C. was 1.01 ($=\eta_{sp.}/c$).

Molding method (reference example).—In 6 cc. of pure m-cresol are dissolved 19 g. of poly-DL-alanine ($\eta_{sp.}/c=2.02$) obtained by polymerization of DL-alanine NCA in tetrachloroethane and prepared according to Preparation (A), and a viscous solution is obtained.

This solution is extruded into an acetone bath of 1 m. length at a speed of 6 m./min. at room temperature through an 0.2 mm. diameter nozzle. After the stretching is carried out to four times the length at once, drying is performed using hot air at a temperature of 80° C., followed by rolling. The yarn thus obtained has a silky luster, and is dissolved off completely with cold water in five minutes.

Example 1

In 50 cc. of p-cresol containing 10% (v./v.) of formic acid is dissolved 1 g. of poly-DL-alanine ($\eta_{sp./c.}=2.20$ in 1% dichloroacetic acid at 25° C.) obtained by polymerization of DL-alanine NCA in tetrachloroethane and prepared according to Preparation (A). A colorless viscous solution is obtained. After applying this solution on a glass plate, it is coagulated by immersing it in a mixed solution consisting of 75 cc. of toluene, 25 cc. of acetone and 4 cc. of formic acid. After one hour, it is stripped from the glass plate and thoroughly washed with acetone at room temperature. Thereafter, a strong, transparent film is obtained by drying it thoroughly at room temperature. The infra-red absorption spectrum of this film (A) is as follows, as compared with the film (B) obtained by coagulating the same polymer solution with acetone, and the film (C) obtained by applying formic acid solution of poly-DL-alanine on the glass plate, followed by drying thereof.

The infra-red spectra of the films (A), (B) and (C) are given in the accompanying figure and summarized below in Table 2.

TABLE 2

| Film | 695 cm.$^{-1}$ | 730 cm.$^{-1}$ | 765 cm.$^{-1}$ | 928 cm.$^{-1}$ | 893 cm.$^{-1}$ | 965 cm.$^{-1}$ | 1,219 cm.$^{-1}$ | 1,245 cm.$^{-1}$ |
|------|------|------|------|------|------|------|------|------|
| (A) | M | S | W | S | S | VS | S | S |
| (B) |   |   | W | W | S | VS | W | S |
| (C) |   |   | VW | VW | S | M |   | S |

Note.—VS: very strong; S: strong; M: medium; W: weak; VW: very weak.

Example 2

In 100 cc. of m-cresol containing 40% formic acid are dissolved 35 g. of poly-DL-alanine ($\eta_{sp./c.}=1.97$ in 1% DCA at 25° C.), and a colorless viscous solution is obtained. This solution is extruded into a mixture of toluene, acetone and formic acid (75:25:4 by volume) through an 0.2 0.2 mm. nozzle at a speed of 6 m./min. at room temperature, and stretched to three times its length in the same bath, followed by settling in toluene at room temperature for 240 hours. Then, drying is carried out. The fiber thus obtained is 4.6 in denier, 1.3 g./d. dry tenacity and 36.5% elongation. Even if this fiber is immersed in hot water at a temperature of 100° C. for several hours, neither dissolution nor swelling takes place. The infra-red absorption spectrum is identical to that of film (A) described in Example 1. This fiber does not dissolve in any of the alcohols, ketones such as acetone, benzophenone and the like, and hydrocarbons, halogenated hydrocarbons, ethers and esters, and can be dyed with a variety of dyestuffs such as acid dye, direct dye, basic dye, dye for acetate rayon, and vat dye. Furthermore, the dyeability can be more readily increased than can that of 6-nylon and polyester fiber.

Example 3

In 100 cc. of phenol containing 22% (v./v.) formic acid are dissolved 38 g. of poly-DL-alanine ($\eta_{sp./c.}=0.987$, 1% in DCA at 25° C.) obtained by polymerization of DL-alanine NCA in chloroform, and a colorless solution stable at room temperature is obtained. This solution is extruded into a mixed solution consisting of toluene, acetone and formic acid (75:25:4 by weight) through an 0.2 mm. nozzle at a speed of 6 m./min. and stretched to 3 times its length in the same bath. Thereafter, a treatment is carried out in acetone at a temperature of 120° C. for five minutes, followed by drying and rolling. The fiber thus obtained has a silky luster and exhibits 4.8 denier, 1.0 g./d. dry tenacity and 29.8% elongation. Furthermore, this fiber is insoluble in cold water and also in hot water at a temperature of 100° C., but is somewhat softened by immersion in hot water for several hours.

Example 4

In 100 cc. of p-chlorophenol containing 20% by volume of trifluoroacetic acid are dissolved 25 g. of poly-DL-alanine ($\eta_{sp./c.}=2.20$, 1% solution in DCA at 25° C.) and a colorless viscous solution is obtained. This solution is extruded into a mixed solution consisting of toluene and acetone (75:25 by volume) through an 0.2 mm. nozzle and stretched to three times its length. Immediately, a treatment is carried out in a boiling carbon tetrachloride bath, followed by drying. Further, washing is carried out with acetone, followed by drying. The fiber thus obtained had a silky luster and had 2.2 g./d. dry tenacity and 32.1% elongation. It does not dissolve in hot water at a temperature of 80° C. by immersion for 8 hours.

Examples 5 to 8

Water-insoluble fibers similar to that of Example 2 can be obtained using a variety of solutions for molding and coagulation solution, and these results are summarized in Table 3 (Examples 5 to 8).

TABLE 3

| Ex. | Polymer ($\eta$ red) | Solution | Polymer Conc., g./100 cc. |
|-----|------|------|------|
| 5 | 0.51 | 3% H$_2$SO$_4$ in m-cresol | 23.0 |
| 6 | 1.97 | HCl-saturated m-cresol | 20.0 |
| 7 | 1.97 | 20% DCA in phenol | 28.1 |
| 8 | 1.01 | 10% monochloroacetic acid in m-cresol | 20.6 |

| Ex. | Coagulation solution | Stretching and Treatment |
|-----|------|------|
| 5 | Toluene + acetone (75:25) | 3 times at room temperature. |
| 6 | Toluene | 3 times at room temperature, left in toluene. |
| 7 | do | 5 times at room temperature, left in toluene. |
| 8 | Benzene plus acetone (90:10) | 3 times at room temperature, in boiling CS$_2$ for 5 minutes. |

| Ex. | Yarn property |
|-----|------|
| 5 | Insol. in cold water, DT=0.5 g./d., DE=28%. |
| 6 | Insol. in hot and cold water, DT=1.1 g./d., DE=31%. |
| 7 | Insol. in hot and cold water, DT=1.4 g./d., DE=33%. |
| 8 | Insol. in cold water, DT=0.8 g./d., DE=24%; insol. in hot water (somewhat softened). |

Example 9

1 g. of poly-DL-alanine having $\eta_{sp./c.}=2.20$ in 1% DCA solution at 25° C. was dissolved in 2.5 g. of phenol containing 4.2% by weight of perchloric acid. The resulting viscous solution was extruded from nozzle of 0.2 mm. diameter into a mixed bath solution consisting of 75 cc. toluene, 25 cc. of acetone and 5 cc. of 60% perchloric acid, at a velocity of 6 m./sec. and a spinning depth of 1 m., and the fiber produced was stretched up to a third as much as the initial length thereof at room temperature. The fiber was immediately subjected to immersing treatment in carbon tetrachloride at 60° C. for 5 minutes in an unstretched state, dried, washed with acetone at room temperature, and then dried. The fiber obtained was: denier 3.1, dry tenacity 1.2 g./denier, elongation 23.6%, and the fiber was insoluble in cold water.

Example 10

1 g. of poly-DL-alanine ($\eta_{sp./c.}=2.20$, 1% DCA solution, at 25° C.) was dissolved in 25 cc. of toluene containing 10% by weight of dichloroacetic acid. The viscous solution obtained was extruded from a nozzle of 0.2 mm. diameter into a mixed bath solution consisting of 95 cc. of toluene and 5 cc. of dichloroacetic acid at a velocity of 6 m./sec. and a spinning depth of 1 m. at room temperature. The fiber extruded was stretched up to three times its initial length. The stretched fiber was immediately immersed in toluene at 80° C. for 5 minutes, dried, washed with acetone at room temperature and dried. The filament obtained was: denier 2.5, dry tenacity 1.6 g./d., elongation 25%, and was insoluble in boiling water.

Example 11

1 g. of poly-DL-alanine ($\eta_{sp./c.}$ = 2.20, 1% DCA solution, at 25° C.) was dissolved in 3.0 g. of p-cresol containing 5% by weight of cyanoacetic acid. The resulting viscous solution was extruded into a mixed solvent of 95 cc. of toluene and 5 cc. of cyanoacetic acid, and the the resulting fiber was stretched up to three times its initial length. The stretched fiber was immediately heated in carbon tetrachloride at 60° C. for 5 minutes in an unstretched state, dried, washed with acetone at room temperature, and dried. The fiber obtained was: denier 7.0, dry tenacity 1.1 g./d., elongation 31% elongation 31%, and was insoluble in hot water.

What we claim is:

1. A method for producing shaped articles of water-insoluble poly-DL-alanine which comprises dissolving a poly-DL-alanine having a reduced viscosity above 0.5 measured in 1% solution of dichloroacetic acid at 25° C. in a mixture consisting of more than 40% by volume of at least one phenol of 6 to 12 carbon atoms, 0.5% to 60% by volume of acids having a pKa value below 5.0 to produce a polymer solution and extruding the polymer solution into a coagulating bath consisting of 50% to 100% by volume of at least one aromatic hydrocarbon, 30% to 0% by volume of acids having a pKa value below 5.0 and 20% to 0% by volume of other organic solvents selected from the group consisting of alcohols, ketones, ethers, nitriles, halogenated hydrocarbons, esters and phenols.

2. A method for producing shaped articles of water-insoluble poly-DL-alanine which comprises dissolving a poly-DL-alanine having a reduced viscosity above 0.5 measured in 1% solution of dichloroacetic acid at 25° C. in a mixture consisting of more than 40% by volume of at least one phenol of 6 to 12 carbon atoms, 0.5% to 60% by volume of acids having a pKa value below 5.0 to produce a polymer solution, extruding the polymer solution into a coagulating bath consisting of 50% to 100% by volume of at least one aromatic hydrocarbon, 30% to 0% by volume of acids having a pKa value below 5.0 and from 20% to 0% by volume of other organic solvents selected from the group consisting of alcohols, ketones, ethers, nitriles, halogenated hydrocarbons, esters and phenols and stretching the resulting coagulated articles from 100% to 1000%.

3. A method for producing shaped articles of water-insoluble poly-DL-alanine which comprises dissolving a poly-DL-alanine having a reduced viscosity above 0.5 measured in 1% solution of dichloroacetic acid at 25° C. in a mixture consisting of more than 40% by volume of at least one phenol of 6 to 12 carbon atoms, from 0.5% to 60% by volume of acids having a pKa value below 5.0 to produce a polymer solution, extruding the polymer solution into a coagulating bath consisting of 50% to 100% by volume of at least one aromatic hydrocarbon, 30% to 0% by volume of acids having a pKa value below 5.0 and 20% to 0% by volume of other organic solvents selected from the group consisting of alcohols, ketones, ethers, nitriles, halogenated hydrocarbons, esters and phenols, stretching the resulting coagulated articles from 100% to 1000% and treating same at a temperature between 40° C. and 250° C. in at least one member selected from the group consisting of aromatic hydrocarbons, halogenated hydrocarbons, and carbon disulfide after said stretching.

4. A method as claimed in claim 1, wherein the poly-DL-alanine has a reduced viscosity of more than 0.6 produced by using as a polymerization solvent, tetrachloroethane purified in the presence of an aromatic hydrocarbon in an amount of 0.01% to 5% by volume based on the total amount of the polymerization solvent.

5. A method as claimed in claim 2, wherein the poly-DL-alanine has a reduced viscosity of more than 0.6 produced by using as a polymerization solvent, tetrachloroethane purified in the presence of an aromatic hydrocarbon in an amount of 0.01% to 5% by volume based on the total amount of the polymerization solvent.

6. A method as claimed in claim 3, wherein the poly-DL-alanine has a reduced viscosity of more than 0.6 produced by using as a polymerization solvent, tetrachloroethane purified in the presence of an aromatic hydrocarbon in an amount of 0.01% to 5% by volume based on the total amount of the polymerization solvent.

References Cited

UNITED STATES PATENTS 2,628,886  2/1953  Bamford et al. _____ 260—77.5

OTHER REFERENCES

A. Elliot, "Behaviour Of A Synthetic Polypeptide Analgous To Protein Denaturation," from nature, vol. 170 (Dec. 20, 1952), pp. 1066–7.

JAMES A. SEIDLECK, *Primary Examiner.*

ALEXANDER H. BRODMERKEL, *Examiner.*

H. H. MINTZ, *Assistant Examiner.*